United States Patent [19]
Yasushi et al.

[11] Patent Number: 5,924,881

[45] Date of Patent: Jul. 20, 1999

[54] ELECTRICAL CONNECTOR FOR IC CARD

[75] Inventors: Uehara Yasushi; Hamano Shoichi, both of Tokyo, Japan

[73] Assignee: DKK, Ltd., Tokyo, Japan

[21] Appl. No.: 09/055,661

[22] Filed: Apr. 6, 1998

[30] Foreign Application Priority Data

Sep. 3, 1997 [JP] Japan .................................. 9-238241

[51] Int. Cl.⁶ .................................................. H01R 29/00
[52] U.S. Cl. ............................................ 439/188; 235/441
[58] Field of Search ................................ 439/188, 630; 235/441

[56] References Cited

U.S. PATENT DOCUMENTS 5,259,777  11/1993  Schuder et al. .......................... 439/188
5,395,259   3/1995  Casses ..................................... 439/188

*Primary Examiner*—Steven L. Stephan
*Assistant Examiner*—Javaid Nasri
*Attorney, Agent, or Firm*—Baker & Botts, L.L.P.

[57] ABSTRACT

An electrical connector for an IC card is incorporated in an IC card reader for reading and writing data from and onto the IC card. A fixed contact piece has a main body extending through both ends of a mounting portion of the connector so as to be fixed to the mounting portion, and both ends as circuit connection terminals. The fixed contact piece further has an L-shaped projection piece having a sufficient elasticity. The contact portion of the L-shaped projection piece and the contact portion of a movable contact piece intersect substantially in a "cross-shaped" figure and contact each other in point contact. With this construction, a complete electrical connection between contact pieces is achieved and the freedom in layout of printed wiring on a base plate is increased.

3 Claims, 5 Drawing Sheets

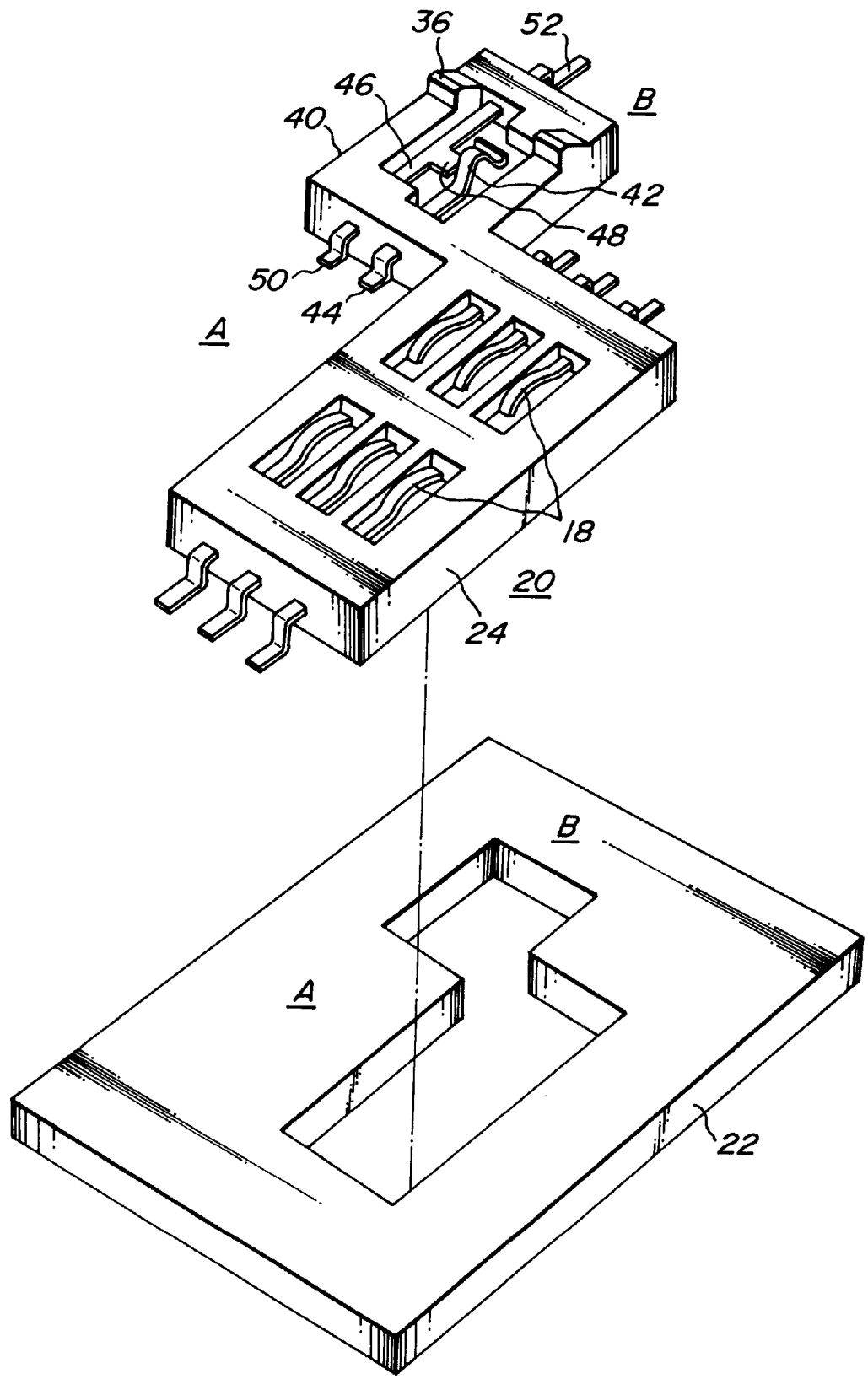
FIG_2

FIG_3
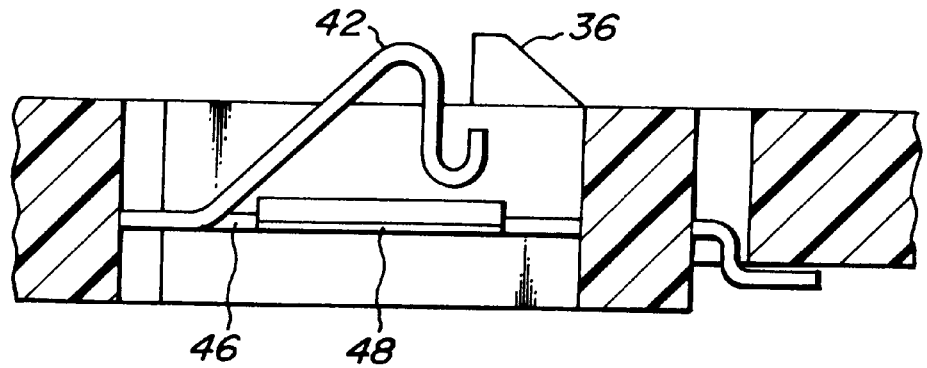
FIG_4
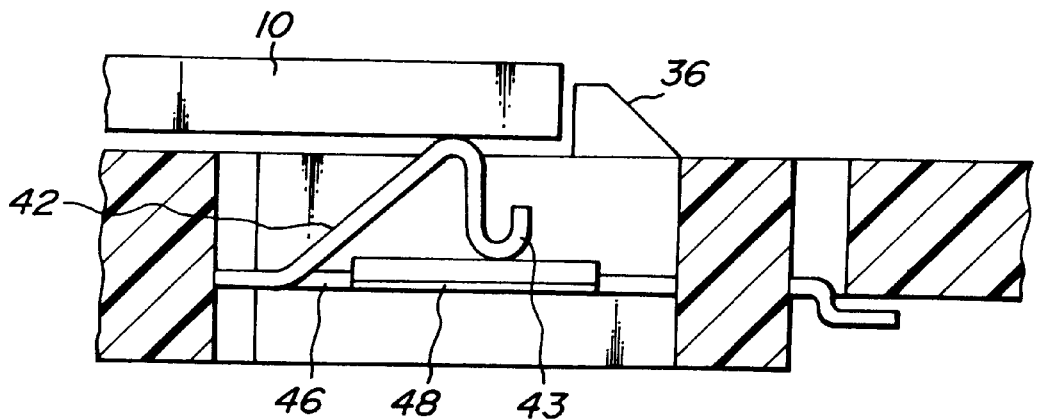
FIG_5
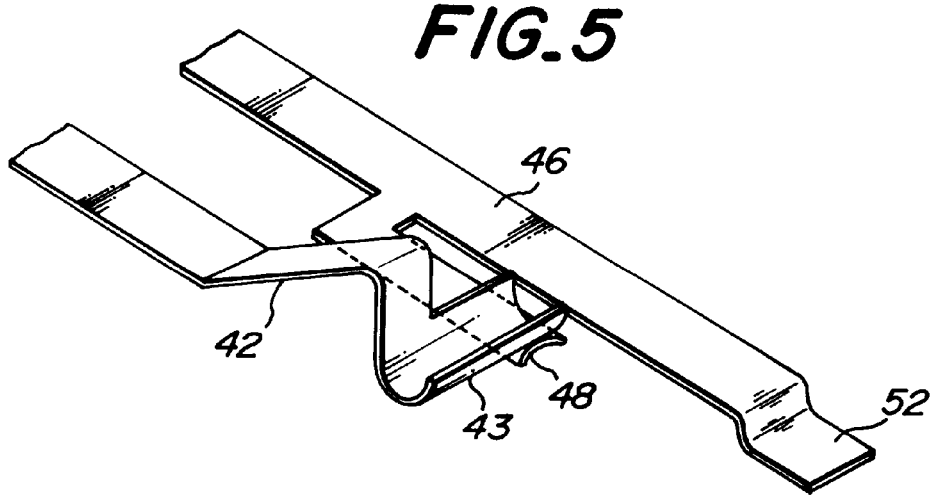

FIG_6a
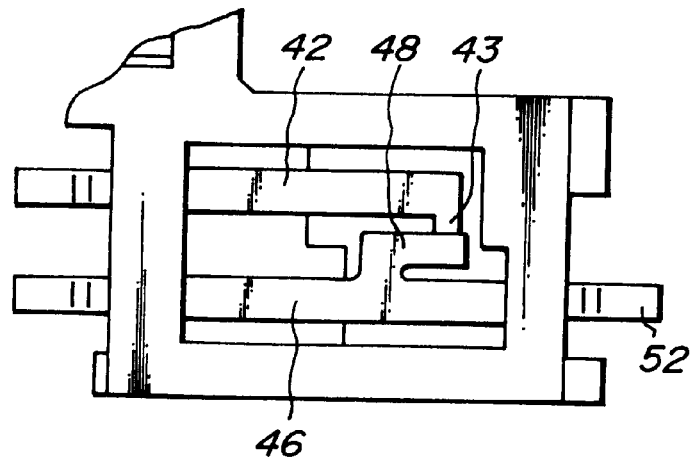
FIG_6b
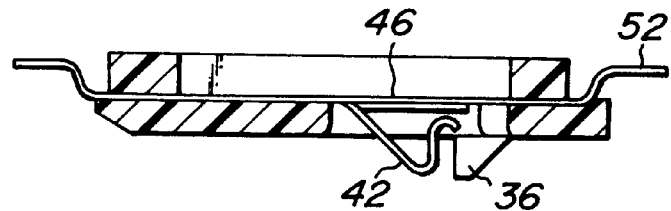
FIG_6c
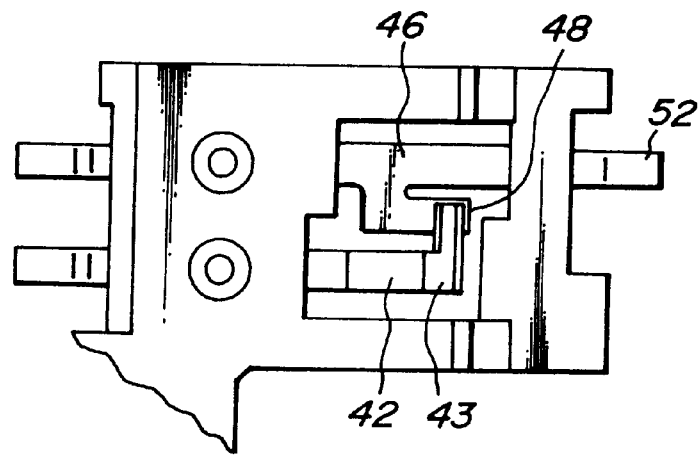

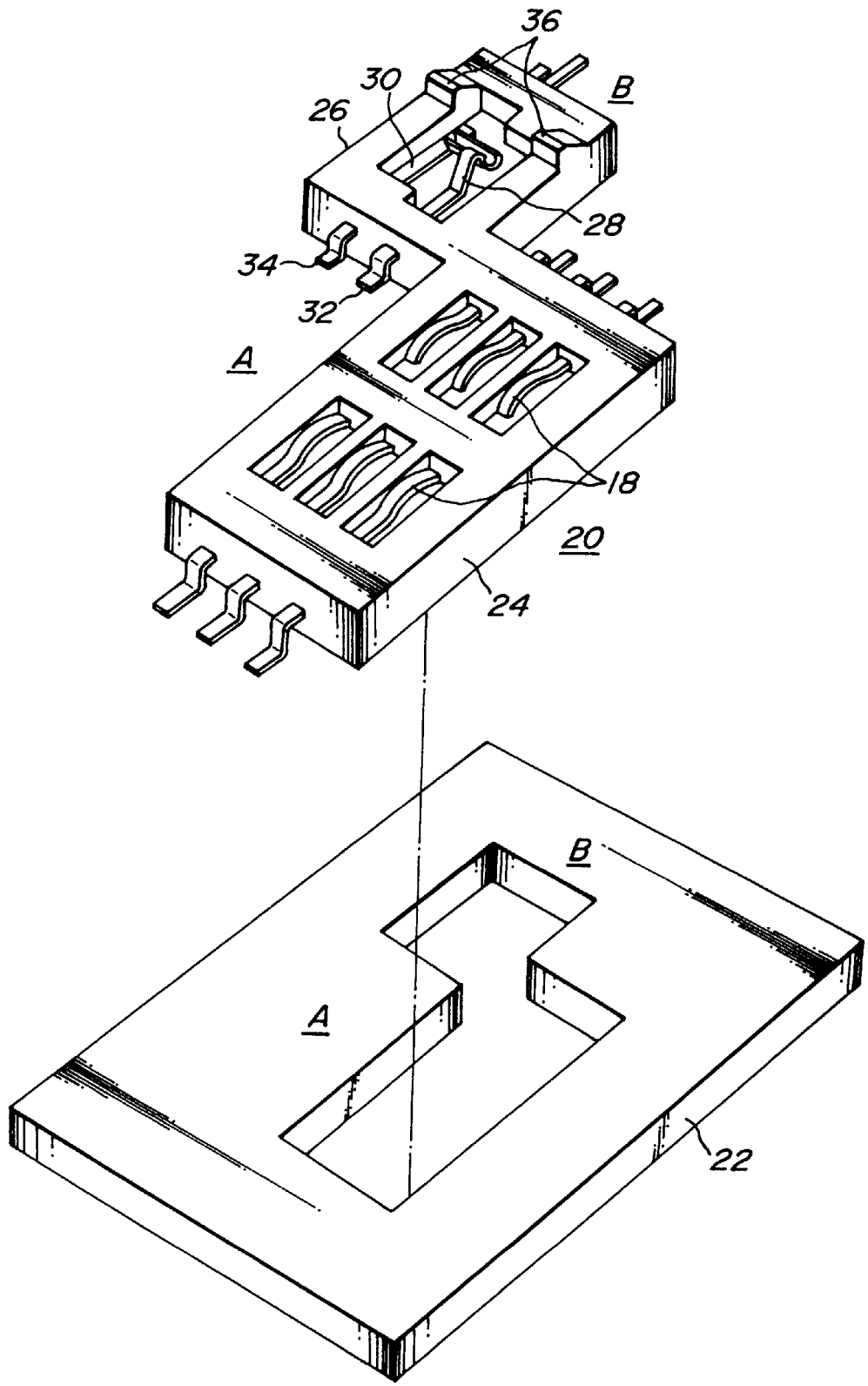
FIG_7
PRIOR ART

ELECTRICAL CONNECTOR FOR IC CARD

BACKGROUND OF THE INVENTION

This invention relates to an electrical connector for an IC card incorporating therein integrated circuits for memorizing and processing various kinds of data, and more particularly to an improvement of an electrical connector for an IC card, which connector is incorporated in an IC card reader and has electric contacts actuated mechanically by an insertion of the IC card into the IC card reader.

The IC card for use in the electrical connector with which the present invention concerns is standardized in JIS (Japanese Industrial Standard) X6301 and X6303, and IC cards having external terminals are standardized in detail in ISO 7810 and 7816. When such an IC card is inserted into a predetermined reading position of a corresponding IC card reader, reading of stored data and writing of required data are performed with the aid of the IC card reader.

Such IC cards are worth using in a wide range such as electronic money or prepaid card. For example, they are utilized as ID cards or cards for paying for pay television watching. Moreover, with the recent development of the automatic paying and receiving system, they may be utilized for paying charges for traffic facilities and autonomous entities.

In order to facilitate the understanding of the invention, first an existing IC card will be explained referring to FIG. 1. An IC card 10 shown in FIG. 1 includes a location for receiving integrated circuits (IC) whose external connection terminals 12 are provided as printed circuits on the surface of the card. A reference numeral 14 designates a space for arranging various ornament design patterns or any information.

When the IC card 10 is inserted in the direction shown by an arrow 16 into a card reader so as to arrive at a predetermined position in the reader, an electrical connection is achieved between the external connection terminals 12 and the electric contacts 18 schematically shown in the drawing, that is, contacts of a connector for connecting the IC card to a reader, thereby performing the required information interchange. These arrangements have been known.

FIG. 7 is an exploded perspective view illustrating an electrical connector of the prior art for an IC card reader. A reference numeral 20 shows a connector assembly for the IC card in its entirety and a reference numeral 22 denotes a base plate for holding the connector fitted therein. The connector 20 is of a shape of two connected rectangles having two mounting portions 24 and 26. These shapes of the mounting portions are determined by way of trial for convenience, so that these shapes themselves are not significant. Six elastic contacts 18 in the form of a cantilever are contacts of the connector for the connection of the IC card and adapted to be in contact with the external connection terminals 12 of the IC card 10 in order to achieve the information interchange between the integrated circuits of the IC card and the IC card reader.

The mounting portion 26 is provided with an ON-OFF switching means of the connector for detecting the insertion of the IC card into the reader. This switching means includes a movable contact piece 28 having one end embedded in the mounting portion 26 when it was molded in order to support the contact piece 28 by the mounting portion 26, and a fixed contact piece 30 fixed to the mounting portion 26 and having one end embedded therein in the same manner as the movable contact piece 28. These contact pieces 28 and 30 have at their ends external terminals or connection pads 32 and 34, respectively. When the IC card is inserted into the connector, the movable contact piece 28 is urged downward from its position shown in FIG. 7 so as to contact the fixed contact piece 30 so that the switching means becomes in the ON-condition, thereby starting the required operations, such as various reading and writing or the like. Protrusions 36 are stoppers serving to determine the final position of the inserted IC card.

With the construction described above, however, the two connection pads 32 and 34 are arranged only in the left area A of the base plate 22 (seen in FIG. 7), with resulting low degree of freedom in layout of connection patterns by printed circuits. Moreover, the fixed connection piece is unsatisfactory with its mechanical strength due to its shape of cantilever.

SUMMARY OF THE INVENTION

It is an object of the invention to provide an improved electrical connector for an IC card, which overcomes all the disadvantages of the prior art described above and which operates with high reliability and exhibits high degree of freedom in layout of connection patterns.

In order to achieve the object, according to the invention a fixed contact piece of switching means comprises a main body and an L-shaped projection piece which projects from the substantially center portion of the main body. The main body is so arranged that it extends through both the ends of a mounting portion made of a molded insulating material so that both the extended ends of the main body are positioned on the opposed areas A and B of a base plate at both the sides thereof. The L-shaped projection piece has an elasticity at its bottom to provide a followability required when it comes into contact with a movable contact piece. Moreover, in order to increase the rigidity of the projection piece in its longitudinal direction, its distal end portion is formed to have a semicircular (partially cylindrical) cross-section by punching and pressing processes.

With the fixed and movable contact pieces as switching elements of the connector according to the invention, the fixed contact piece extends through both the walls of the mounting portion so as to be fixed, thereby enabling the opposed areas A and B on the base plate to be free spaces for wiring to increase the degree of freedom in layout of connection patterns and further to increase the number of terminals to be fixed to the base plate with resulting high holding force of the connector.

Although main body of the fixed contact piece is rigidly fixed to the mounting portion described above, the fixed contact piece is formed with the L-shaped projection piece as a contact portion, thereby facilitating to keep invariably the elastic contact with the movable contact piece. In other words, it is possible to stabilize the contact pressure between the contact pieces and to prevent the change in contact pressure caused by repeated use, thereby facilitating to maintain the constant contact pressure between the contact pieces.

Moreover, both the contact pieces contact with their cylindrical surfaces intersecting in a "cross-shaped" figure to accomplish a point contact therebetween, thereby obtaining a stability in electrical characteristics at the electrical contact position.

The above effects of the invention are summarized as follows:

1. The main body of the fixed contact piece is fixed in the support frame body with both ends of the main body being embedded in the support frame body when being molded, while the L-shaped projection piece of the fixed contact piece is elastically supported by the connection portion of the projection piece to the fixed contact piece to facilitate achieving the invariable elastic contact between the movable and fixed contact pieces.

2. The fixed contact piece has two protruding ends as connection terminals on the areas A and B of the base plate, thereby making easy the layout in printed wiring.

3. Both the contact pieces contact with their cylindrical surfaces intersecting in a "cross-shaped" figure to accomplish a point contact therebetween, thereby ensuring the good electrical contact.

The invention will be more fully understood by referring to the following detailed specification and claims taken in connection with the appended drawings.

BRIEF DESCRIPTION OF THE DRAWINGS

FIG. 2 is an exploded perspective view illustrating the electrical connector for an IC card according to the invention;

FIG. 3 is a side view of the switching elements of the connector in inoperative position according to the invention;

FIG. 4 is a side view of the switching elements of the connector in operative position according to the invention;

FIG. 5 is a perspective view illustrating the switch elements of the connector according to the invention in more detail;

FIG. 6a is a bottom plan view of the switching elements of the connector according to the invention in more detailed real figures;

FIG. 6b is a side view of the switching elements of the connector according to the invention in more detailed real figures;

FIG. 6c is a plan view of the switching elements of the connector according to the invention in more detailed real figures; and FIG. 7 is an exploded perspective view illustrating a connector for an IC card of the prior art.

DESCRIPTION OF THE PREFERRED EMBODIMENTS

Figure 1:
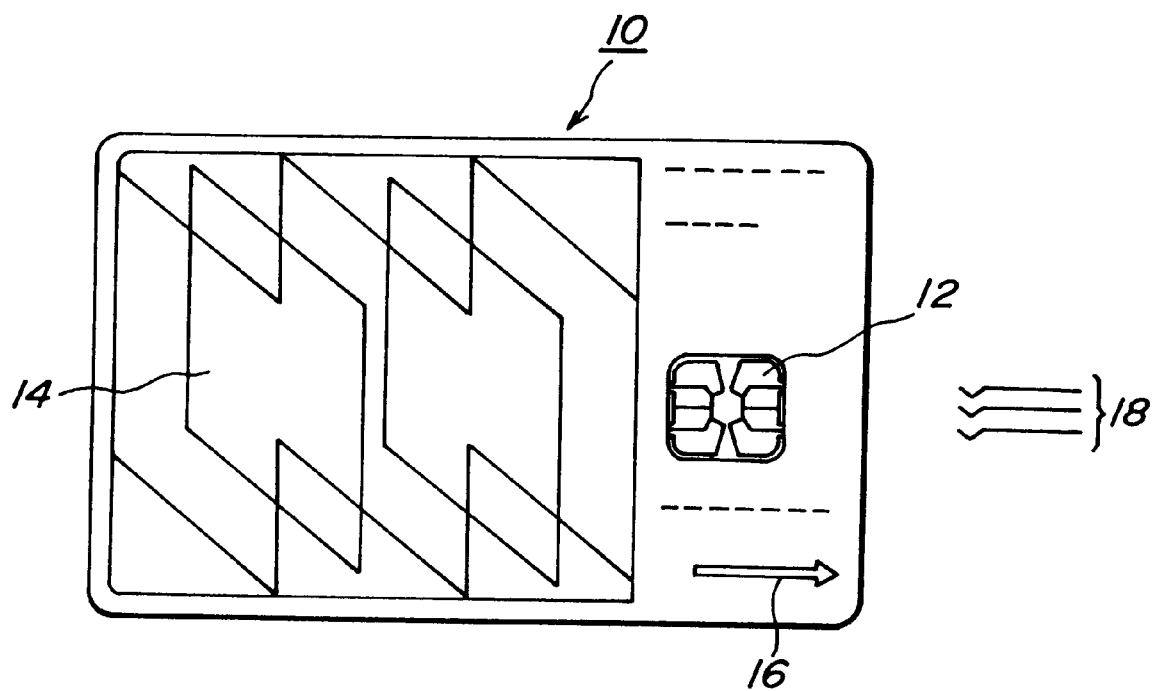
FIG. 1 is a schematic view for explaining a conventional IC card.

FIG. 2 is an exploded perspective view illustrating an electrical connector for IC cards according to the invention, wherein like components have been designated by the same reference numerals as in FIG. 7.

A reference numeral 22 denotes a base plate for mounting a connector assembly 20 therein and a reference numeral 24 shows a mounting portion for mounting therein a plurality of contacts 18 adapted to be in contact with external connection terminals 12 incorporated in an IC card.

The difference of the connector assembly according to the invention from that of the prior art lies in the switching means of the connector and its mounting portion 40. With the mounting portion 40, a fixed contact piece 46 includes a main body provided extending through the molded walls of the mounting portion 40, and two protruding ends (connection pads) 50 and 52 which are adapted to be in contact with opposed areas A and B of the base plate 22, respectively. The fixed contact piece 46 is further provided with an L-shaped projection piece 48 which projects from the substantially center portion of the main body. The projection piece 48 cooperates with the contact portion 43 of a movable contact piece 42 to provide a good electrical contact therebetween.

These portions are shown in FIGS. 3 to 5 on enlarged scales. FIG. 3 is an enlarged side view partly in section illustrating the part of the mounting portion 40 prior to insertion of an IC card, wherein the movable contact piece 42 does not yet contact the projection piece 48 of the fixed contact piece 46 so that they are in "OFF" condition.

FIG. 4 illustrates the inserted IC card 10 into the connector, wherein the contact portion 43 of the movable contact piece 42 has been mechanically urged downward viewed in the drawing so that the contact portion 43 contacts the L-shaped projection piece 48 of the fixed contact piece 46 in a "cross-shaped" figure as viewed in FIG. 5. As shown in more detail in FIG. 5, they contact each other in point contact, because the contact portion 43 of the movable contact piece 42 and the L-shaped projection piece 48 of the fixed contact piece 46 are partially cylindrical or semicircular, respectively, which are convex on the side opposite to each other. The connection portion of the projection piece 48 to the fixed contact piece 46 has a sufficient elasticity to ensure the followability of the projection piece 48 when contacting.

FIGS. 6a, 6b and 6c illustrate the switching means of the connector according to the invention in a manner to show them in real figures.

While the invention has been particularly shown and described with the electrical connector for use in the reader for the IC card, it will be understood by those skilled in the art that the present invention is also applicable to electrical or electronic equipment other than those described above without being limited to those in the embodiments.

What is claimed is:

1. An electrical connector for an IC card, which is to be incorporated into an IC card reader for reading and writing data from and onto the IC card and has switching means operative when the IC card has been inserted into the electrical connector, wherein said switching means comprises a fixed contact piece and a movable contact piece, said fixed contact piece comprising a main body and an L-shaped projection piece, said main body extending through both ends of a switching means mounting portion of an insulator so as to be fixed by the switching means mounting portion, and having both ends as circuit connection terminals, and said L-shaped projection piece projecting from the substantially center of said main body to have an elasticity, and said movable contact piece comprising a contact portion having a shape capable of intersecting with a contact portion of said L-shaped projection piece and partially cylindrical which is convex on the side of said L-shaped projection piece.

2. The electrical connector for an IC card as set forth in claim 1, wherein said contact portion of said L-shaped projection piece is also partially cylindrical which is convex on the side of the contact portion of said movable contact piece so as to accomplish a point contact between the contact portions of said movable and fixed contact pieces.

3. The electrical connector for an IC card as set forth in claim 1, wherein said circuit connection terminals of the fixed contact piece at its both ends are fixing portions of the connector including said switching means on opposed areas of a base plate and provide reference points for wiring at said opposed areas.

* * * * *

UNITED STATES PATENT AND TRADEMARK OFFICE
CERTIFICATE OF CORRECTION

PATENT NO. : 5,924,881
DATED : July 20, 1999
INVENTOR(S) : Uehara et al.

It is certified that error appears in the above-identified patent and that said Letters Patent is hereby corrected as shown below:

Title Page, Item [19]: "Yasushi et al." should read -- Uehara et al. --;

Title Page, Item [75] Inventors: "Uehara Yasushi;" should read -- Yasushi Uehara; -- ; and "Hamano Shoichi," should read -- Shoichi Hamano, --.

Signed and Sealed this

Nineteenth Day of June, 2001

*Attest:*

*Attesting Officer*

NICHOLAS P. GODICI
*Acting Director of the United States Patent and Trademark Office*